United States Patent
Scibora

(10) Patent No.: US 7,194,555 B2
(45) Date of Patent: Mar. 20, 2007

(54) COMPRESSION AND REMOTE STORAGE APPARATUS FOR DATA, MUSIC AND VIDEO

(76) Inventor: Marco Scibora, 767 Winslow Ave., St. Paul, MN (US) 55107

( * ) Notice: Subject to any disclaimer, the term of this patent is extended or adjusted under 35 U.S.C. 154(b) by 767 days.

(21) Appl. No.: 09/759,798

(22) Filed: Jan. 12, 2001

(65) Prior Publication Data

US 2002/0035644 A1   Mar. 21, 2002

Related U.S. Application Data

(60) Provisional application No. 60/175,675, filed on Jan. 12, 2000.

(51) Int. Cl.
 *G06F 15/16* (2006.01)
(52) U.S. Cl. ............... 709/247; 709/202; 709/217; 709/229; 709/231; 382/232
(58) Field of Classification Search ........ 709/217–219, 709/225–226, 229, 246–247, 202–203, 231–233; 382/232; 358/451–453; 348/552
 See application file for complete search history.

(56) References Cited

U.S. PATENT DOCUMENTS

| 3,990,710 A | 11/1976 | Hughes |
| 4,279,185 A | 7/1981 | Alonso |
| 4,703,465 A | 10/1987 | Parker |
| 4,839,505 A | 6/1989 | Bradt et al. |

(Continued)

FOREIGN PATENT DOCUMENTS

EP   0505304 A2   9/1992

(Continued)

OTHER PUBLICATIONS

XP-002167172, "Server Side 'Compresslets' for Internet Multimedia Streams", Holger Bonisch, Konrad Froitzheim, pp. 82-86, 1999 IEEE.

(Continued)

*Primary Examiner*—Bharat Barot
(74) *Attorney, Agent, or Firm*—Gerald E. Helget; Nelson R. Capes; Briggs and Morgan, P.A.

(57) ABSTRACT

A method for compressing digital content from a source, using a compression scheme selected from a group of available compression schemes, storing the compressed content at a central location, and retrieving the compressed content at a remote location. The method uses the steps of: a) at a remote location, prompting a user for and validating a user name and password; b) at a remote location, reading the source and prompting a user for tracks to be compressed, the user then identifying selected tracks; c) at a remote location, prompting a user for a compression scheme to be used to compress the selected tracks, the user then identifying a selected compression scheme from a group of possible compression schemes; d) at a remote location, compressing the selected tracks using the selected compression scheme; e) transmitting each selected track after compression through a communications link to a central location; f) storing each selected track in a digital content database at a central location; and g) at a remote location, retrieving tracks from the digital content database through a communications link to the central location.

31 Claims, 5 Drawing Sheets

U.S. PATENT DOCUMENTS

| | | | |
|---|---|---|---|
| 4,924,303 A | 5/1990 | Brandon et al. | |
| 5,172,363 A | 12/1992 | Greenspun | |
| 5,177,728 A | 1/1993 | Otsubo et al. | |
| 5,228,021 A | 7/1993 | Sato et al. | |
| 5,237,157 A | 8/1993 | Kaplan | |
| 5,262,875 A | 11/1993 | Mincer et al. | |
| 5,301,315 A * | 4/1994 | Pellicano | 707/4 |
| 5,329,572 A | 7/1994 | Martens | |
| 5,418,713 A | 5/1995 | Allen | |
| 5,428,353 A | 6/1995 | Bird | |
| 5,428,592 A | 6/1995 | Endo | |
| 5,428,593 A | 6/1995 | Kanai et al. | |
| 5,481,478 A | 1/1996 | Palmieri et al. | |
| 5,497,502 A | 3/1996 | Castille | |
| 5,515,347 A | 5/1996 | Mulder et al. | |
| 5,546,324 A | 8/1996 | Palmer et al. | |
| 5,546,369 A | 8/1996 | Lee et al. | |
| 5,548,281 A | 8/1996 | Funahashi et al. | |
| 5,555,098 A | 9/1996 | Parulski | |
| 5,566,379 A | 10/1996 | Mawatari et al. | |
| 5,568,455 A | 10/1996 | Balsom | |
| 5,596,647 A | 1/1997 | Wakai et al. | |
| 5,617,386 A | 4/1997 | Choi | |
| 5,625,404 A | 4/1997 | Grady et al. | |
| 5,629,867 A | 5/1997 | Goldman | |
| 5,631,745 A | 5/1997 | Wong | |
| 5,632,007 A * | 5/1997 | Freeman | 706/59 |
| 5,633,839 A | 5/1997 | Alexander et al. | |
| 5,668,788 A | 9/1997 | Allison | |
| 5,687,279 A | 11/1997 | Matthews | |
| 5,689,481 A | 11/1997 | Tamura et al. | |
| 5,691,964 A | 11/1997 | Niederlein et al. | |
| 5,699,328 A | 12/1997 | Ishizaki et al. | |
| 5,734,630 A | 3/1998 | Nishigori et al. | |
| 5,734,719 A | 3/1998 | Tsevdos et al. | |
| 5,740,134 A | 4/1998 | Peterson | |
| 5,748,594 A | 5/1998 | Nishio et al. | |
| 5,768,223 A | 6/1998 | Li | |
| 5,784,558 A | 7/1998 | Emerson et al. | |
| 5,838,383 A | 11/1998 | Chimoto et al. | |
| 5,839,108 A | 11/1998 | Daberko et al. | |
| 5,860,068 A | 1/1999 | Cook | |
| 5,900,608 A | 5/1999 | Iida | |
| 5,920,353 A | 7/1999 | Diaz et al. | |
| 5,950,206 A | 9/1999 | Krause | |
| 5,999,505 A | 12/1999 | Yasui | |
| 6,115,035 A * | 9/2000 | Compton et al. | 345/717 |
| D431,605 S | 10/2000 | Scibora | |
| 6,185,625 B1 * | 2/2001 | Tso et al. | 709/247 |
| 6,208,273 B1 * | 3/2001 | Dye et al. | 341/51 |
| 6,253,264 B1 * | 6/2001 | Sebastian | 710/68 |
| 6,271,455 B1 * | 8/2001 | Ishigaki et al. | 84/605 |
| 6,298,385 B1 * | 10/2001 | Sparks et al. | 709/233 |
| 6,304,914 B1 * | 10/2001 | Deo et al. | 709/247 |
| 6,369,835 B1 * | 4/2002 | Lin | 345/726 |
| 6,385,656 B1 * | 5/2002 | Appelman | 709/247 |
| 6,421,726 B1 * | 7/2002 | Kenner et al. | 709/225 |
| 6,421,733 B1 * | 7/2002 | Tso et al. | 709/246 |
| 6,463,445 B1 * | 10/2002 | Suzuki et al. | 707/200 |
| 6,496,868 B2 * | 12/2002 | Krueger et al. | 709/247 |
| 6,502,194 B1 * | 12/2002 | Berman et al. | 713/201 |
| 6,549,942 B1 * | 4/2003 | Janky et al. | 709/219 |
| 6,662,060 B1 * | 12/2003 | Maliszewski et al. | 700/94 |
| 6,747,762 B1 * | 6/2004 | Josephsen et al. | 358/453 |
| 2003/0112335 A1 * | 6/2003 | Strandwitz et al. | 348/552 |

FOREIGN PATENT DOCUMENTS

| | | |
|---|---|---|
| EP | 0649121 A2 | 4/1995 |
| EP | 0 696 127 | 2/1996 |
| EP | 0711073 A2 | 5/1996 |
| EP | 0720157 A2 | 7/1996 |
| EP | 0817139 A2 | 1/1998 |
| EP | 0920013 A1 | 6/1999 |
| FR | 2712104 A1 | 5/1995 |
| FR | 2714760 A1 | 7/1995 |
| GB | 2063541 A | 6/1981 |
| JP | 08237711 | 9/1996 |
| JP | 09185868 | 7/1997 |
| WO | WO 94/15416 | 7/1994 |
| WO | WO-95/30212 | 11/1995 |
| WO | WO 96/41285 | 12/1996 |
| WO | WO-98/25364 | 6/1998 |
| WO | WO-98/48363 | 10/1998 |
| WO | WO-98/48532 | 10/1998 |
| WO | WO-00/30117 | 5/2000 |
| WO | WO-00/63903 | 10/2000 |
| WO | WO-00/67261 A1 | 11/2000 |

OTHER PUBLICATIONS

XP-002069024 Digital Underground, Wired Jan. 1997, 5 pgs.
XP-002069600, NCR, Advanced Communication Design may offer video/sound system, Apr. 20, 1993, 1 pg.
XP-002069601, Advanced Communication Design, Home of the Star Series of Products for Commercial Previewing, Oct. 22, 1995, 2 pgs.
Music Machine, Music on Demand, brochure, 4 pgs.
XP-002145152, A DSP Powered Solid State Audio System, Jason Kridner, Mark Nadeski, Pedro Gelabert, Mar. 15, 1999, 4 pgs.

* cited by examiner

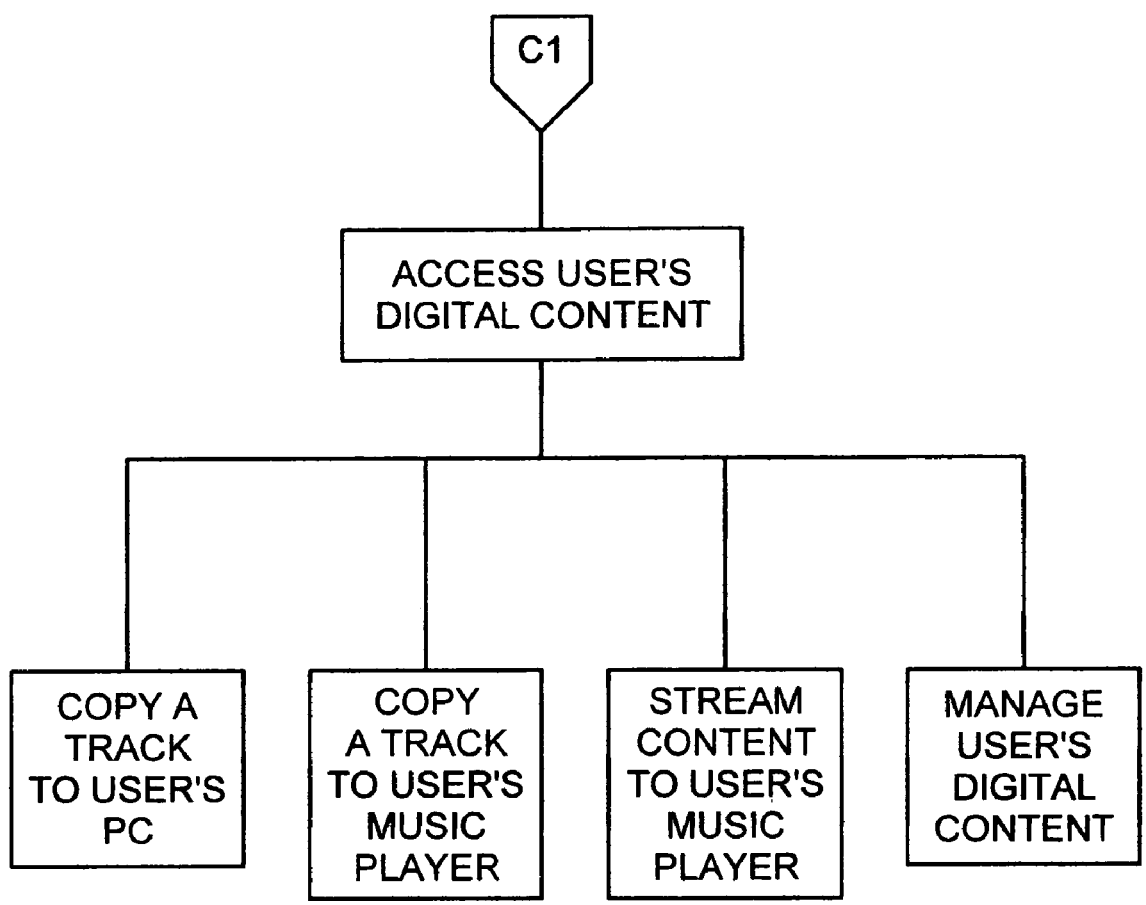

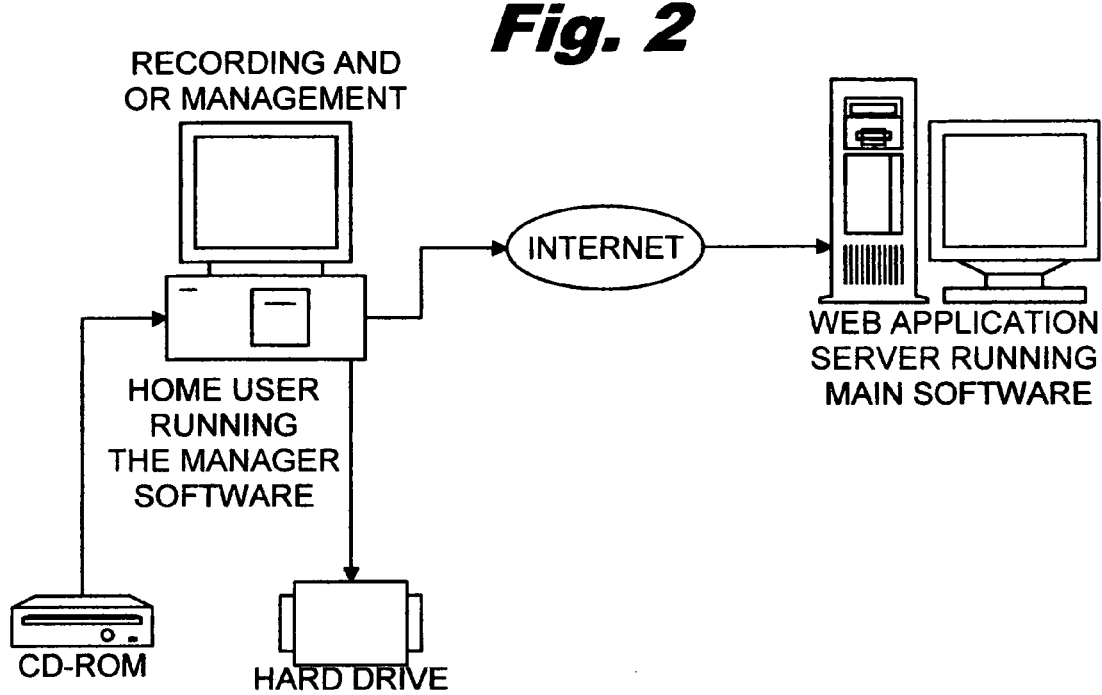
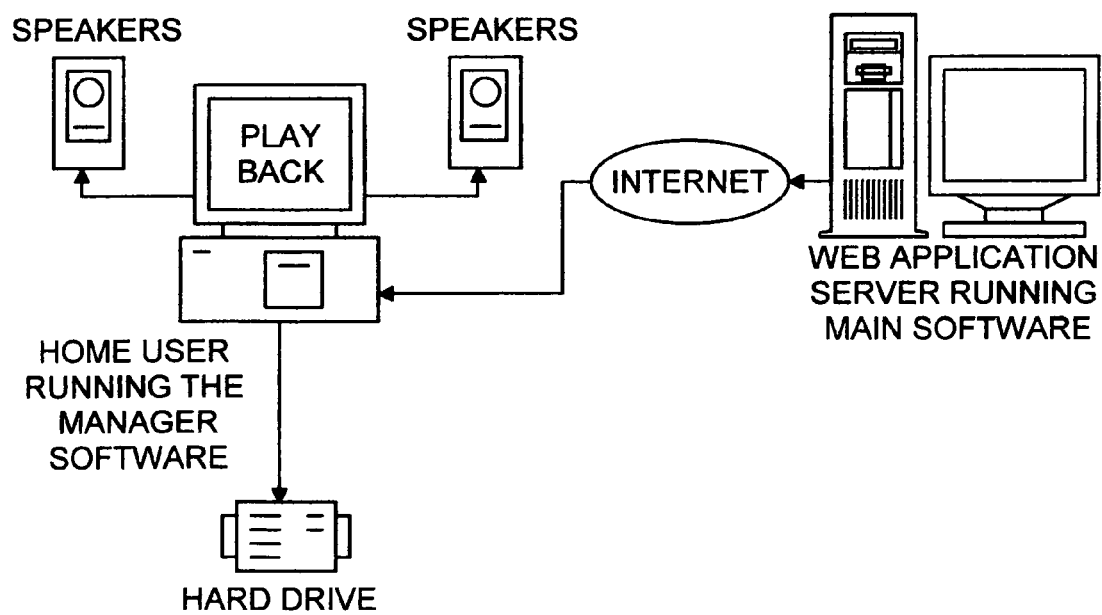

COMPRESSION AND REMOTE STORAGE APPARATUS FOR DATA, MUSIC AND VIDEO

This application is a continuation of a provisional application, Ser. No. 60/175,675, filed Jan. 12, 2000.

BACKGROUND OF THE INVENTION

Since the beginning of the Internet phenomenon, the general population has been intrigued with its popularity and the effect it will have on traditional businesses. Even though powerful in concept, the Internet is nothing more than a vast volume of computer users connected via public accessed Wide Area Networks (WAN). Such a digital network links millions of people to freely move data between each other allowing communication, information distribution, entertainment, etc. The most similar comparison to such a vast communication network is the world telephone network. The only difference is that instead of telephones one would use a digital computing device (computer) and instead of analog audio (voices) parties would communicate in a digital format over digital connection. So, if you could convert your analog voice into digital format, send it over telephone lines and then convert it back into analog format at the destination point, you will have the general concept of the INTERNET (there are now digital telephones allowing such communications). So in a nutshell, the Internet allows people to communicate (transport) digital information between each other thousands of miles a part. The computer's job is to translate digital and analog information such as text, images, full motion video, audio, etc. back and forth for humans to understand.

To move digital content from one point to another is similar to moving water through pipes used in any house. Water pipes are like the digital line(s), water is like the digital content and sinks installed in different parts of the house are like computers. Like moving water in the pipes, the amount of data to be moved over a specific period of time over digital lines is limited by its size (the technical term is bandwidth). If there is a need to move a specific amount of data from one point to another within a specific period of time, one would have to engineer such a line with appropriate bandwidth (many businesses design such configurations to avoid delays in data delivery). That means that if the bandwidth of a network line would stay constant (as is the case with standard telephone lines) and the digital content to be transported over the line increases, the time to move it would increase also. However, if the same digital content could be made smaller (compressed) the time to move it would decrease. This is the main reason for such aggressive efforts in the development of digital compression techniques. The main objective of shrinking (compressing) the digital content is to reduce the transmission time over limited bandwidth network line linking each individual computer user.

Since the Internet provides the foundation to move such digital content across the world in a fraction of a second, one can now understand the power of such commerce. It is clearly obvious that the Internet could have a tremendous impact on industries creating and managing such digital content. Music and video industries are scrambling to capitalize on many opportunities the Internet offers but at the same time they drag their feet allowing digital distribution of music and video. They fear to lose control over their digital content to piracy and unauthorized content distribution to millions of people worldwide without compensation.

The opportunity to cash in on this lucrative and highly desirable business of digital compression technologies provoked major companies like AT&T and Microsoft to step in and ride the growing popularity of digital music distribution. A few years back, there were no companies working on the digital compression techniques. Today they are as follows:

| Name of the company | Compression code |
| --- | --- |
| AT&T | a2b |
| Microsoft | |
| Real Networks | Real Audio |
| Liquid Audio | Liquid Audio |
| Public Domain | MPEG |

Each of these compression schemes offers unique benefit to the end user. Most of them average a compression ratio of about 1 to 12. Higher compression reduces the audio quality, where lower compression improves it. An end user may download the standard software player from the company's Website at no cost. Real Network has been able to penetrate the Internet users with their players making them the largest in the main stream Internet market.

Having such ability to compress music and video content, end users can now either stream (play music files from remote location (Websites) in real time without the need to copy it onto local drive) or download music files at 10 to 20 times the speed. As digital music files are shrinking with the advances of compression algorithms many new opportunities themselves are on the hardware, software and Web-based services arena.

Today, any computer user plugged into the Internet can listen to audio files or watch motion video from remote Websites. As the compression schemes improve and network bandwidth increases, the quality of audio and video delivery over the Internet will improve. Compression advancements gave birth to hardware development for portable music player devices. These new devices offer digital storage of compressed music files and playback. Unlike the traditional CD's these players are equipped with removable or embedded media capable of storing vast number of tracks. Now, owners of such devices can make their own music compilations from original CDs or downloaded via the Internet.

The main problem in providing the full benefit of these technologies is that there is a missing element to make such changeover seamless for the user. Any user can purchase multiple software or hardware portable players to play music under different compression schemes, but there is no easy way to convert his existing library of CDs into the desired compression schemes. The present invention solves the missing element to provide an easy way to compress music and video file on demand and to store the compressed files at a remote site for later retrieval.

SUMMARY OF THE INVENTION

The present invention is oriented toward a Web-based software application designed for automated compression of music/video, which is first extracted from the original media source and then stored remotely for future access. This service will be available to home and business users having access to the Internet world via a computer equipped with a CD ROM or DVD drive.

Unlike individual compression software, the present invention will provide an easy means for any Internet user to compress in any format by simple clicks, without the need for hardware, conversion of existing computers, etc.

The present invention includes:

1) A website designed to provide multiple choice of desired compression schemes;
2) Remote software (called Main Software) capable of recognizing and validating the existence of original CD);
3) A small program (called Manager) to be downloaded by the user to manage the user's CPU to perform the compression task; and
4) Remote, website media storage to provide immediate transfer of compressed music files for future retrieval or exclusive music playback (streaming) over the Internet by the user/owner of the music.

The present invention is designed to benefit the exploding number of Internet music users. It is to provide pertinent services to assist the Internet users to compress, store and manage music without the need of hardware. A single website provides superior means of selecting a compression scheme and conveniently storing all compressed tracks for future use. Users will also be able to compare the quality of each compression scheme for different types of music. For the first time an Internet user may elect to compress any track from original CDs, use the preferred compression scheme, and store the compressed track outside of his/her computer via a single application offered in the website.

When Internet users enter the website, all the management of various services offered with be performed on a single server without the need to link them with multiple sites as is the case today in choosing various compression software providers. Web-based compression services eliminate complex means of obtaining and installing compression software and different user interfaces designed by different software manufacturers. Most importantly, the user's computer need not use up valuable storage space as the Website stores the music for the user. The service offers a uniform user interface regardless of which compression scheme is selected and convenient storage.

The user will now have the choice to compress any track obtained from other lawful sources, such as other Websites, offering music downloading, or custom music delivery.

BRIEF DESCRIPTION OF THE DRAWINGS

FIGS. 2–4 are block diagrams of the systems used with the present invention.

DETAILED DESCRIPTION OF THE PREFERRED EMBODIMENT

Figure 1A:
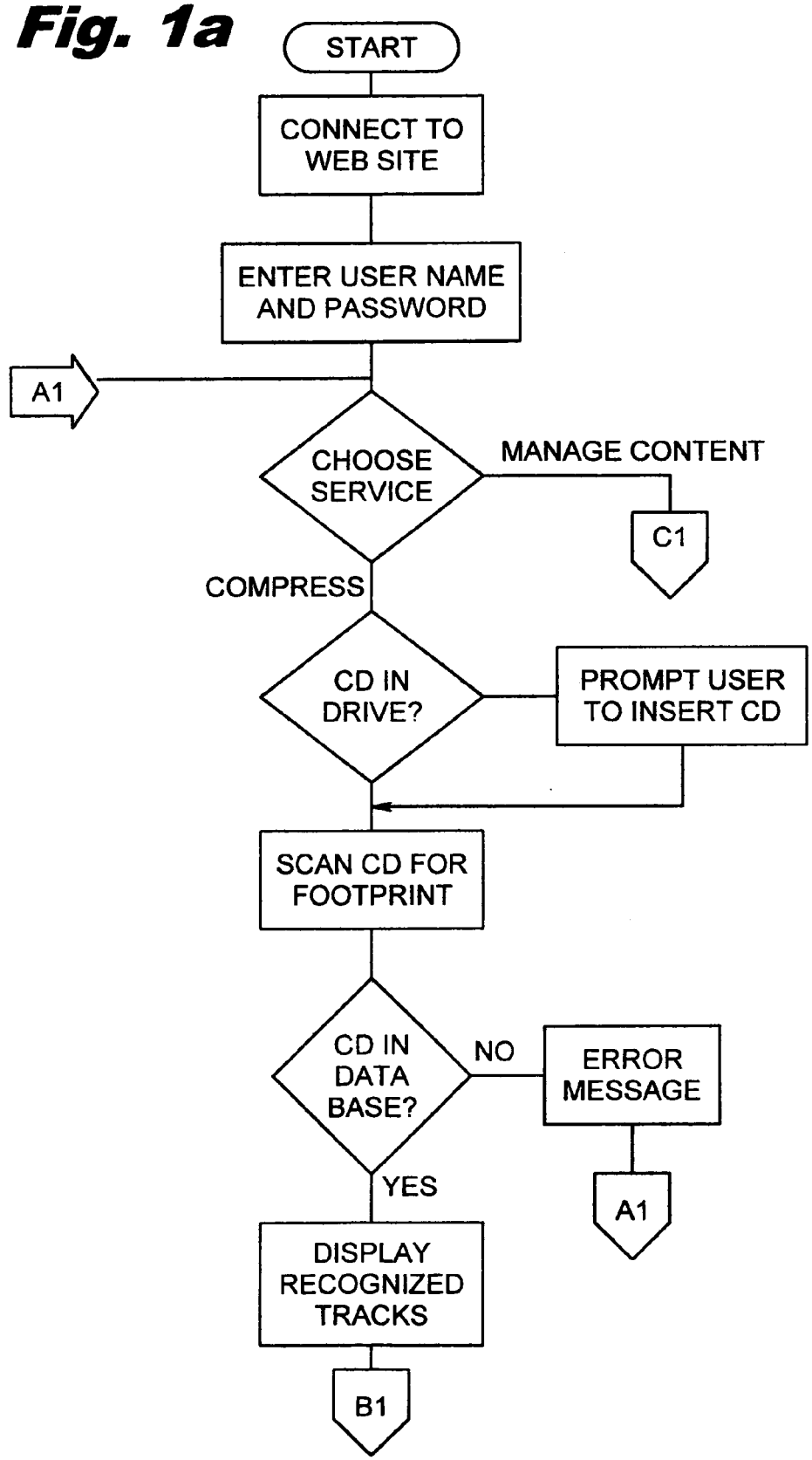
FIG. 1 is a flowchart of the method of the present invention.
Figure 1B:
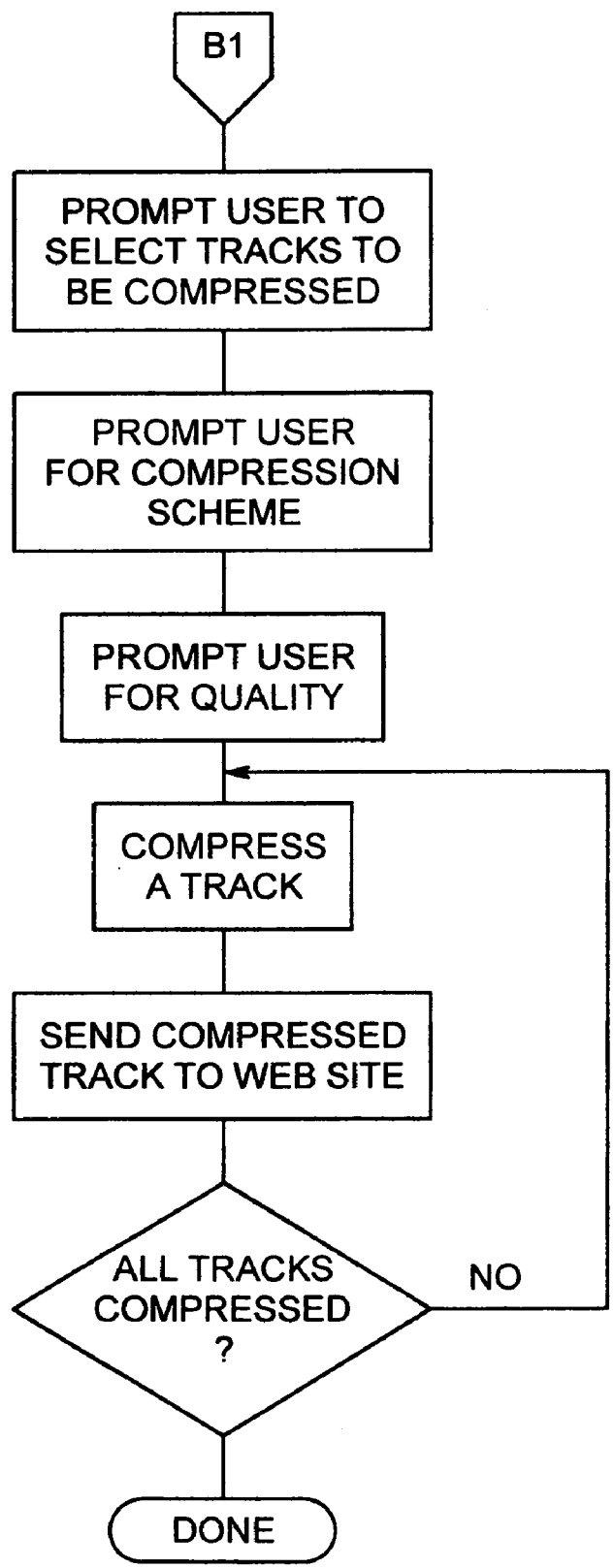
Figure 4:
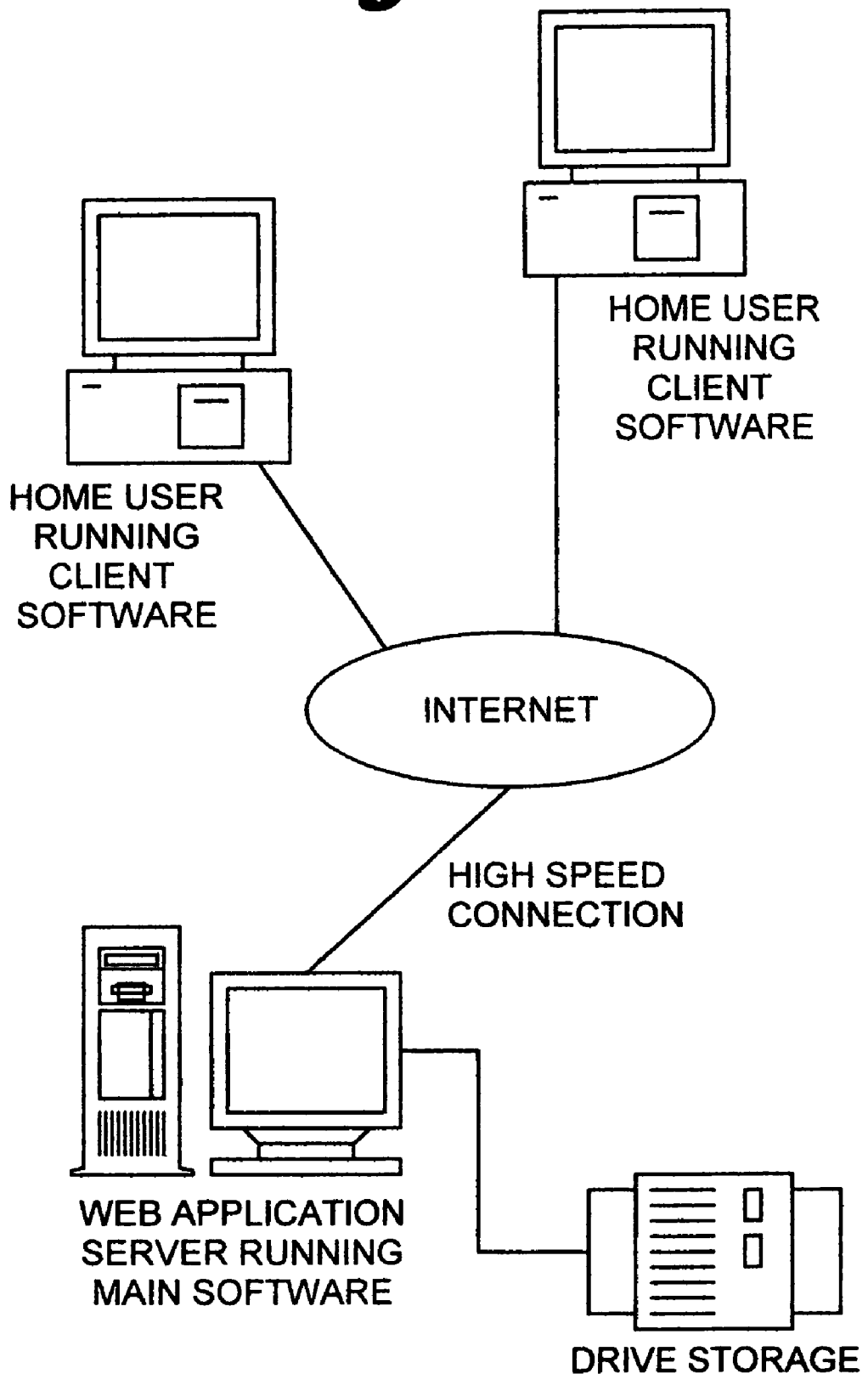

The CD digital music format represents identical audio quality of the original CD recording. It is important to convey here that EVERY compression scheme will reduce the quality of music from the original CD. The level of quality deterioration may also be varied dependent on the type of music being compressed. One also has to understand that even though low compression is hard, it is difficult to distinguish from the original recording with human ear, nevertheless, quality suffers.

The following is the chronological order in which the services will be available to the end user:

Service Registration Interface: This graphical interface is designed to provide the user with full control of the services provided. This interface will be the only part interacting with the user and no additional hardware is required. It is our intention to make the functionalities of the feature to be very easy and intuitive through a single click concept.

When the user accesses the Website, the screen will advise the user of what is the main function of these services. In order to use the system, the user will need to register with a unique name and six-character password. The name and the password are required to assign uniquely identifiable space on the Website's storage media to provide secure management of the compressed files by the user.

When the user acknowledges that he/she is ready to use the services by virtue of registering, it will prompt the user to select either the compression feature or the management of content already compressed and stored on the Website.

Compression Service Interface: After selecting compression services, the interface will prompt the user to insert a CD of their choice in the caddie of the CD drive (if the CD has been already inserted the prompt will not appear).

Only if required, the manager software will scan the content of the original CD for its footprint and send the information to the main software for verification (against an existing database of original CDs) that the CD title in the caddie is the original one. If it does not match the Website's database, the user will not be able to perform any compression functions.

Once the CD is found and recognized, the screen will display all track numbers (and track titles if they are part of the original CD) recognized by the software. The text prompt on the screen will ask the user to select the desired track(s) the user wishes to compress by simply clicking a designated icon identifying the track selection (i.e. pick, light up the track, etc.).

After all the tracks are selected, the user can click on an icon named "Choose Compression". After the Choose Compression icon is selected, the screen will change to show the following:

1) All tracks selected by the user to be compressed;
2) Different compression schemes with selectable high, medium and low quality;
3) An icon identified as "Go ahead to Compress".

Once the compression scheme and audio quality has been selected (via mouse click) the manager will begin to compress each track at the time using the user's CPU (computer processor).

While each track is being compressed, it will simultaneously be sent to the Website storage for future management and/or retrieval. Depending on the bandwidth of the connection, speed of the user's CPU and the CD drive, the transmission of the compressed tracks sent to the Website may take longer than the actual compression process. There are many variables, which may effect the speed of the compression itself as well as the transmission of compressed tracks to the Website.

Post Compression Services Interface: Once all compressed tracks are transmitted to the Website, the user may access the Website and manage all of the tracks for its own use. Having a unique handle and password, each user is assured exclusive use of his/her digital content. The user may access his/her digital content to copy any track onto his/her computer, add/delete tracks, manage and create predefined ("jukebox") streaming, renaming tracks, almost anything the user could do if tracks were on his private computer (storage device).

This services provides convenient and central storage of compressed music tracks accessed from anywhere in the world. The compressed tracks could be played by any device capable of streaming compressed music while linked to the Internet Website. It also could be used to download compressed files onto portable music players like Rio, Ijam, RCA, etc. or burn onto CD for playback by ACD's patented universal CD player or any other universal CD played. Each user will be in control of compression and the transmission of the user's music.

The present invention may be embodied in other specific forms without departing from the spirit or essential attributes thereof, and it is therefore desired that the present embodiment be considered in all respects as illustrative and not restrictive.

What is claimed:

1. A method for compressing digital content from a source, using a compression scheme selected from a group of available compression schemes, storing the compressed content at a central location, and retrieving the compressed content at a remote location, comprising the steps of:
   a) at a remote location, prompting a user for and validating a user name and password;
   b) at a remote location, reading the source and prompting a user for tracks to be compressed, the user then identifying selected tracks;
   c) at a remote location, prompting a user for a compression scheme to be used to compress the selected tracks, the user then identifying a selected compression scheme from a group of possible compression schemes;
   d) at a remote location, compressing the selected tracks using the selected compression scheme;
   e) transmitting each selected track after compression through a communications link to a central location;
   f) storing each selected track in a digital content database at a central location; and
   g) at a remote location, retrieving tracks from the digital content database through a communications link to the central location.

2. The method of claim 1, further comprising the step of identifying the source and validating the source's identity against an authorization database at the central location.

3. The method of claim 1, further comprising the step of prompting the user for the quality of compression to be used with the selected compression scheme.

4. The method of claim 1, wherein the digital content is music.

5. The method of claim 1, wherein the digital content is video.

6. The method of claim 1, wherein the source is a compact disc.

7. The method of claim 1, wherein the source is a digital video disc.

8. The method of claim 1, wherein the communications link is the Internet.

9. The method of claim 1, wherein the step of retrieving the digital content further comprises a step of streaming the digital content for replay to a remote location.

10. The method of claim 1, wherein the step of retrieving the digital content further comprises a step of storing the retrieved digital content at the remote location.

11. The method of claim 1, further comprising a step of managing the digital content database from the remote location.

12. A method for compressing digital content from a source, using a compression scheme selected from a group of available compression schemes, storing the compressed content at a central location, and retrieving the compressed content at a remote location, comprising the steps of:
   a) at a remote location, prompting a user for and validating a user name and password;
   b) identifying the source and validating the source's identity against an authorization database at the central location;
   c) at a remote location, reading the source and prompting a user for tracks to be compressed, the user then identifying selected tracks;
   d) at a remote location, prompting a user for a compression scheme to be used to compress the selected tracks, the user then identifying a selected compression scheme from a group of possible compression schemes;
   e) at a remote location, compressing the selected tracks using the selected compression scheme;
   f) transmitting each selected track after compression through a communications link to a central location;
   g) storing each selected track in a digital content database at a central location; and
   h) at a remote location, retrieving tracks from the digital content database through a communications link to the central location.

13. The method of claim 12, further comprising the step of prompting the user for the quality of compression to be used with the selected compression scheme.

14. The method of claim 12, wherein the digital content is music.

15. The method of claim 12, wherein the digital content is video.

16. The method of claim 12, wherein the source is a compact disc.

17. The method of claim 12, wherein the source is a digital video disc.

18. The method of claim 12, wherein the communications link is the Internet.

19. The method of claim 12, wherein the step of retrieving the digital content further comprises a step of streaming the digital content for replay to a remote location.

20. The method of claim 12, wherein the step of retrieving the digital content further comprises a step of storing the retrieved digital content at the remote location.

21. The method of claim 12, further comprising a step of managing the digital content database from the remote location.

22. A method for compressing digital content from a source at a client, using a compression scheme selected from a group of available compression schemes, storing the compressed content at a central server, and retrieving the compressed content at a client, comprising the steps of:
   at the client:
   a) prompting a user for and validating a user name and password;
   b) identifying the source and validating the source's identity against an authorization database at the server;
   c) reading the source and prompting a user for tracks to be compressed, the user then identifying selected tracks;
   d) prompting a user for a compression scheme to be used to compress the selected tracks, the user then identifying a selected compression scheme from a group of possible compression schemes;
   e) compressing the selected tracks using the selected compression scheme;
   f) transmitting each selected track after compression through a communications link to the server; at the server:
   g) storing each selected track in a digital content database at the server; and at the client:

h) retrieving tracks from the digital content database through a communications link to the server.

23. The method of claim 22, further comprising the step of prompting the user for the quality of compression to be used with the selected compression scheme.

24. The method of claim 22, wherein the digital content is music.

25. The method of claim 22, wherein the digital content is video.

26. The method of claim 22, wherein the source is a compact disc.

27. The method of claim 22, wherein the source is a digital video disc.

28. The method of claim 22, wherein the communications link is the Internet.

29. The method of claim 22, wherein the step of retrieving the digital content further comprises a step of streaming the digital content for replay to a client.

30. The method of claim 22, wherein the step of retrieving the digital content further comprises a step of storing the retrieved digital content at the client.

31. The method of claim 22, further comprising a step of managing the digital content database from the client.

* * * * *